US007701931B2

(12) United States Patent
Kajiwara

(10) Patent No.: US 7,701,931 B2
(45) Date of Patent: Apr. 20, 2010

(54) NETWORK COMMUNICATION APPARATUS AND METHOD FOR PERFORMING A T.38 COMMUNICATION FUNCTION USING A VOICE CAPABILITY OF A GATEWAY APPARATUS

(75) Inventor: Tomohito Kajiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1185 days.

(21) Appl. No.: 11/282,654

(22) Filed: Nov. 21, 2005

(65) Prior Publication Data

US 2006/0126605 A1 Jun. 15, 2006

(30) Foreign Application Priority Data

Nov. 25, 2004 (JP) .............................. 2004-340307

(51) Int. Cl.
H04L 12/66 (2006.01)
(52) U.S. Cl. ....................... 370/356; 370/287; 370/352; 358/400; 379/88.13; 709/218
(58) Field of Classification Search ................................ 379/100.01–102.07, 88.13; 370/287, 352, 370/356; 358/400; 709/218
See application file for complete search history.

(56) References Cited

U.S. PATENT DOCUMENTS

| 6,463,135 | B2 * | 10/2002 | Abrishami et al. ...... 379/100.01 |
| 7,068,763 | B2 * | 6/2006 | Burrell et al. ............ 379/88.13 |
| 7,286,496 | B2 * | 10/2007 | Koide et al. .................. 370/287 |
| 7,480,287 | B2 * | 1/2009 | Tanimoto .................... 370/352 |
| 2001/0036176 | A1 * | 11/2001 | Girard ......................... 370/352 |
| 2003/0072272 | A1 * | 4/2003 | Koide et al. ................. 370/298 |
| 2003/0084122 | A1 * | 5/2003 | Saito ........................... 709/218 |
| 2004/0001224 | A1 |  1/2004 | Kajiwara |
| 2004/0057421 | A1 * | 3/2004 | Kawabata et al. ........... 370/352 |
| 2004/0184110 | A1 * | 9/2004 | Maei et al. .................. 358/400 |
| 2005/0110616 | A1 |  5/2005 | Kajiwara |
| 2005/0207547 | A1 |  9/2005 | Kajiwara |
| 2005/0213569 | A1 |  9/2005 | Kajiwara |

FOREIGN PATENT DOCUMENTS

| CN | 1417987 | 5/2003 |
| JP | 2000-312265 | 11/2000 |
| JP | 2002-111952 | 4/2002 |

OTHER PUBLICATIONS

"ITU International Telecommunication Union", ITU-T Telecommunication Standardization Sector of ITU, H.323, Series H: Audiovisual and Multimedia Systems, 2000, pp. 1-224.

Xiuying Nie, "The Development of Call Establishment Procedure Standard for the Real-Time Facsimile Call", Chinese Data Communication Network, Aug. 31, 1999, pp. 17-21 (with English Translation).

* cited by examiner

*Primary Examiner*—Gerald Gauthier
(74) *Attorney, Agent, or Firm*—Oblon, Spivak, McClelland, Maier & Neustadt, L.L.P.

(57) ABSTRACT

A network communication apparatus that includes a function for performing communications via an IP network and that includes an ITU-T standard T.38 communication function but does not include a voice communication function is disclosed. The network communication apparatus includes: a unit configured to generate a call connection signal including T.38 communication capability and dummy voice capability to start call connection operation; and a unit configured to perform T.38 communication operation after sending a dummy CNG packet when detecting that a second network communication apparatus at the other end does not include the T.38 communication function based on a call connection signal received from the second network communication apparatus.

8 Claims, 9 Drawing Sheets

FIG.3

| DUMMY CNG DATA #1 (G711) |
|---|
| DUMMY CNG DATA #2 (G729AnnexA) |

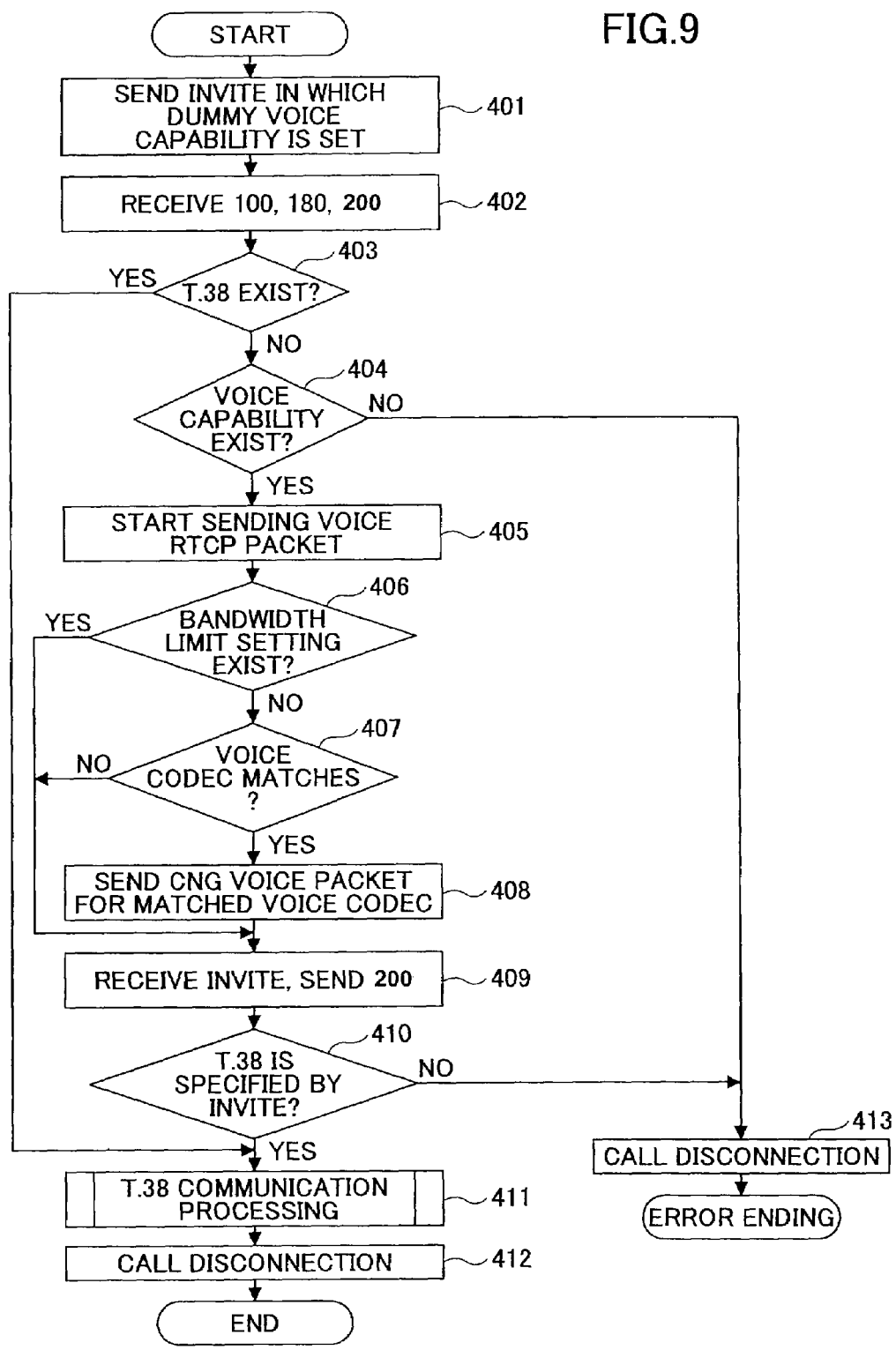

NETWORK COMMUNICATION APPARATUS AND METHOD FOR PERFORMING A T.38 COMMUNICATION FUNCTION USING A VOICE CAPABILITY OF A GATEWAY APPARATUS

BACKGROUND OF THE INVENTION

1. Field of the Invention

The present invention relates to a network communication apparatus that does not include a voice communication function and that includes an ITU-T standard T.38 communication function and a function for performing communication via an IP network.

2. Description of the Related Art

In the past, for performing facsimile communication (real time facsimile communication) via the IP network, the ITU-T standard T.38 scheme for packetizing and exchanging ITU-T standard T.30 signals and the ITU-T standard G.711 (PCM) scheme for performing communications by dealing with facsimile data as voice data and the like are in practical use (refer to non-patent document 1: TTC standard JT-H323).

For performing facsimile communication by the ITU-T standard T.38 scheme, since voice ability is not essential, communication can be performed only having ability necessary for facsimile communication conforming to the ITU-T standard T.38.

In addition, in the ITU-T standard G.711 (PCM) scheme, communication can be performed by converting facsimile data to voice data and exchanging the voice data via a voice channel.

Therefore, for performing real time facsimile communications by the ITU-T standard T.38 scheme, it is only necessary to establish a facsimile communication channel. In addition, for performing real time facsimile communications by the ITU-T standard G.711 (PCM) scheme, it is only necessary to establish a voice channel.

On the other hand, in recent years, telephone conversation between a telephone terminal within an IP network and a telephone terminal connected to an analog public circuit network (PSTN: Public Switched Telephone Network) is becoming available by connecting between the IP network such as the Internet and the analog public circuit network via a VoIP (voice over IP) gateway.

The VoIP gateway has a gateway function that can be used by the ITU-T standard H.323 terminal and a SIP (Session Initiation Protocol) terminal, for example. The T.38 terminal apparatus for performing real time facsimile communication in the ITU-T standard T.38 scheme is included in H.323 terminals. Thus, by using the VoIP gateway, facsimile communications can be performed between the T.38 terminal in the IP network and the group 3 facsimile apparatus connected to the analog public circuit network.

However, when the T.38 terminal originates a call to the group 3 facsimile apparatus that is connected to the analog public circuit network, there is a case in which following problem occurs.

That is, as mentioned above, when the T.38 terminal apparatus originates a call to the group 3 facsimile apparatus, the T.38 terminal apparatus is connected to the analog public circuit network via the VoIP gateway.

In VoIP gateways currently used, there are some VoIP gateways that include the T.38 gateway function, but that report T.38 communication availability to the origination-side T.38 terminal apparatus after verifying that a destination-side terminal apparatus (PSTN side) includes the group 3 facsimile communication function.

Therefore, when the T.38 terminal apparatus originates a call to the group 3 facsimile apparatus, there is a case in which call connection cannot be properly performed according to the function of the relaying VoIP gateway, so that facsimile communication cannot be performed.

SUMMARY OF THE INVENTION

An object of the present invention is to provide a network communication apparatus that can properly perform facsimile communication with a group 3 facsimile apparatus that is connected to the analog public circuit network.

The object is achieved by a network communication apparatus that includes a function for performing communications via an IP network and that includes an ITU-T standard T.38 communication function but does not include a voice communication function, the network communication apparatus including:

a unit configured to generate a call connection signal including T.38 communication capability and dummy voice capability to start call connection operation;

a unit configured to perform T.38 communication operation after sending a dummy CNG packet when detecting that a second network communication apparatus at the other end does not include the T.38 communication function based on a call connection signal received from the second network communication apparatus.

The object is also achieved by a network communication apparatus that includes a function for performing communications via an IP network and that includes an ITU-T standard T.38 communication function but does not include a voice communication function, the network communication apparatus including:

a unit configured to generate a call connection signal including T.38 communication capability and dummy voice capability to start call connection operation;

a unit configured to perform T.38 communication operation after sending a dummy CNG packet when detecting that a second network communication apparatus at the other end does not include the T.38 communication function and detecting that the second network communication apparatus includes the dummy voice capability based on a call connection signal received from the second network communication apparatus; and a unit configured to perform T.38 communication operation without sending the dummy CNG packet when detecting that the second network communication apparatus does not include any one of the T.38 communication function and the dummy voice capability based on the call connection signal.

The object is also achieved by a network communication apparatus that includes a function for performing communications via an IP network and that includes an ITU-T standard T.38 communication function but does not include a voice communication function, the network communication apparatus including:

a unit configured to generate a call connection signal including T.38 communication capability and dummy voice capability to start call connection operation;

a unit configured to perform, when bandwidth limitation is not set in the network communication apparatus, T.38 communication operation after sending a dummy CNG packet when detecting that a second network communication apparatus at the other end does not include the T.38 communication function and detecting that the second network communication apparatus includes the dummy voice capability based on a call connection signal received from the second network communication apparatus, and configured to perform T.38 communication operation without sending the dummy CNG packet when detecting that the second network communication apparatus does not include any one of the T.38 communication function and the dummy voice capability; and a unit configured to perform T.38 communication operation without sending the dummy CNG packet when the bandwidth limitation is set.

According to the present invention, the network communication apparatus sets a dummy voice channel to the gateway in the call connection procedure at the time of call origination so as to send the dummy CNG packet. Therefore, when a destination apparatus is configured to automatically perform switching operation into facsimile, the CNG packet can cause the destination apparatus to switch from telephone to facsimile, so that facsimile communication can be performed properly.

In addition, when the gateway does not include a voice capability the same as the dummy voice capability, T.38 communication operation starts. Therefore, even though this is depending on the function of the gateway, there is an effect that there is a case where facsimile communication can be performed.

In addition, when the bandwidth limitation is set in the network communication apparatus, T.38 communication operation starts without sending dummy CNG packet. Thus, even though this is depending on the function of the gateway, there is an effect that there is a case where facsimile communication can be performed.

BRIEF DESCRIPTION OF THE DRAWINGS

Other objects, features and advantages of the present invention will become more apparent from the following detailed description when read in conjunction with the accompanying drawings, in which:

FIG. 3 shows an example of stored dummy CNG packets;

FIG. 9 is a flowchart showing further processing example performed by the network communication apparatus FX at the time of call origination.

DETAILED DESCRIPTION OF THE PREFERRED EMBODIMENTS

In the following, embodiments of the present invention are described in detail with reference to figures.

Figure 1:
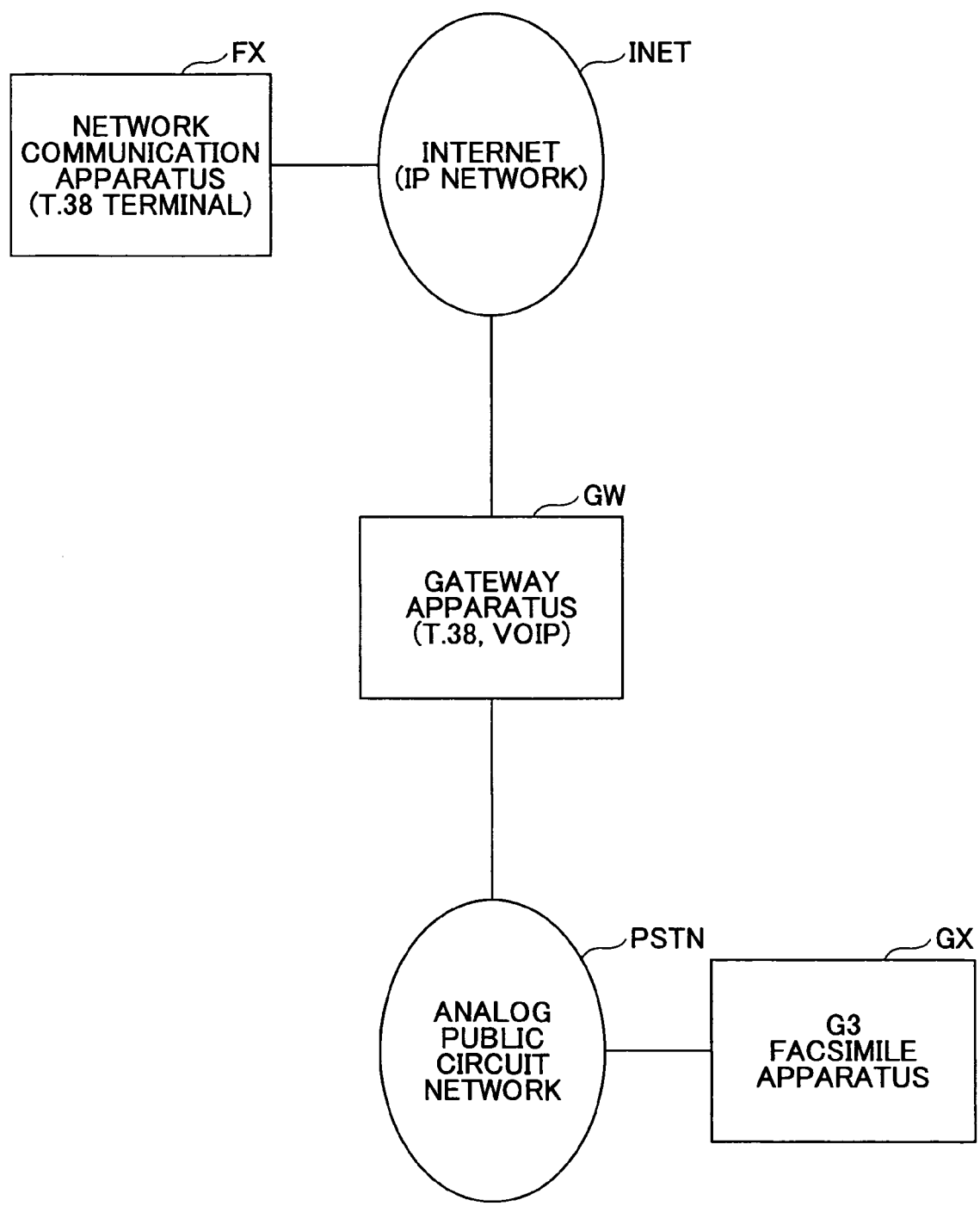
FIG. 1 is a block diagram showing an example of a communication network of an embodiment of the present invention.

FIG. 1 shows an example of a communication network of an embodiment of the present invention.

In the figure, a network communication apparatus FX includes only the ITU-T standard T.38 communication function, but does not include any voice communication function. The network communication apparatus FX can communicate with other communication terminals via the Internet (IP network) INET.

The gateway apparatus GW connects between the internet INET and the analog public circuit network PSTN, and enables to perform communications between a terminal apparatus (the network communication apparatus FX, for example) connected to the Internet INET and a communication apparatus (group 3 facsimile apparatus GX, for example) connected to the analog public circuit network (PSTN). The gateway apparatus GW includes a VoIP gateway function and a T.38 gateway function.

The group 3 facsimile apparatus GX includes a communication function such as CCITT recommendations T.30, T.4 and the like, and can perform facsimile communication via the analog public circuit network PSTN.

Figure 2:
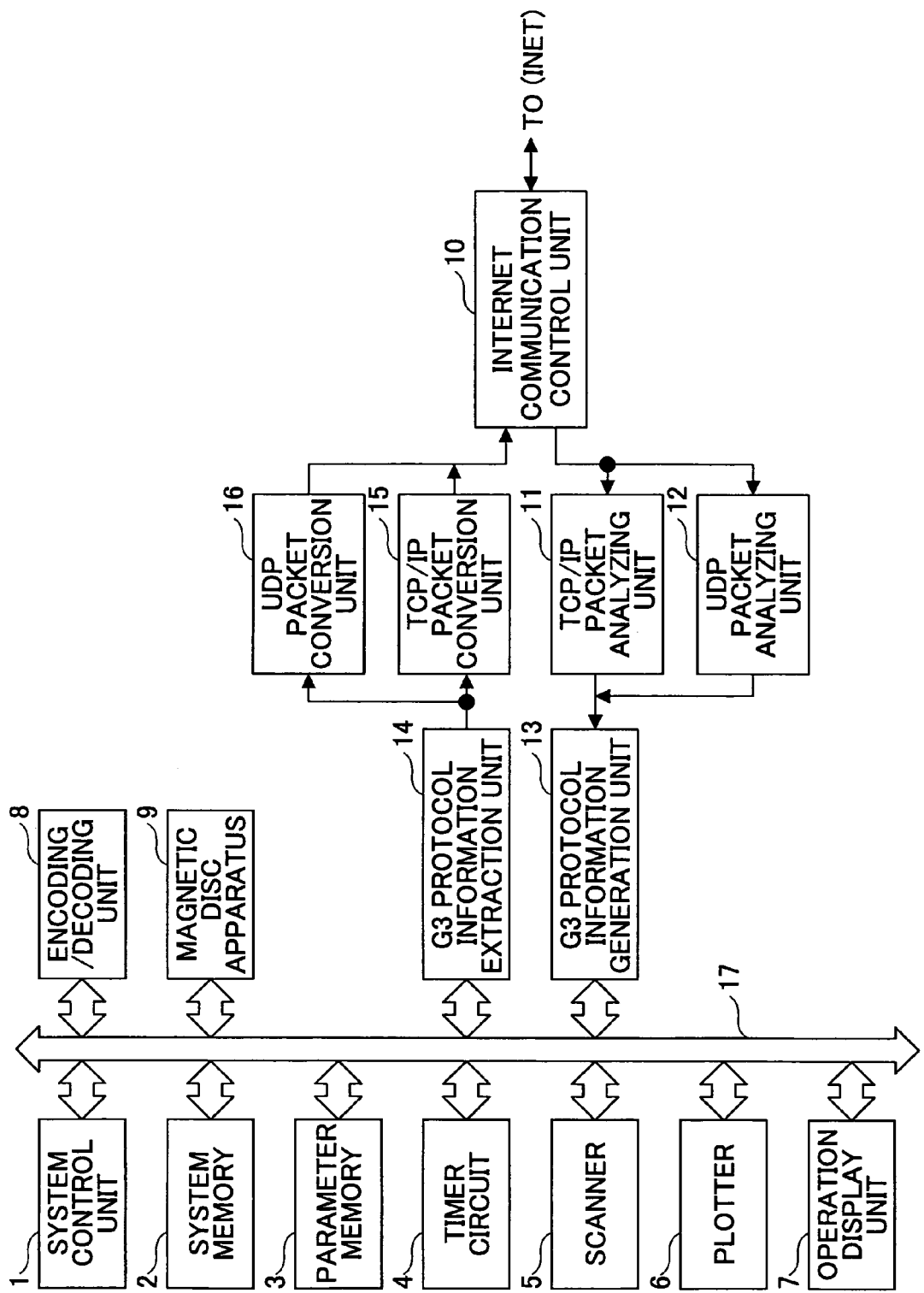
FIG. 2 is a block diagram showing an example of the network communication apparatus FX.

FIG. 2 shows an example of the network communication apparatus FX. In the figure, the system control unit 1 performs various control processing such as control processing for each unit of the network communication apparatus FX and real time transmission control procedure processing (ITU-T standard T.38 procedure). A system memory 2 stores a control processing program performed by the system control unit 1 and various data necessary for executing the processing program, and forms a work area of the system control unit 1. The parameter memory 3 stores various information specific for the network communication apparatus FX. A timer circuit 4 outputs current time information.

The scanner 5 reads a document image with a predetermined resolution. The plotter 6 stores and outputs an image with a predetermined resolution. An operation display unit 7 is for operating the facsimile apparatus, and includes various operation keys and various display units.

An encoding/decoding unit 8 encoding-compresses an image signal, and decodes encoding-compressed image information into the original image signal. In this case, the encoding/decoding unit 8 is mainly used for detecting an error when receiving image information. A magnetic disk apparatus 9 stores many encoding-compressed image information files and other data files.

An internet communication control unit 10 connects the network communication apparatus FX to the Internet INET, and exchanges various data via the Internet INET. A TCP/IP packet analyzing unit 11 extracts received information by analyzing a TCP/IP packet received by the internet communication control unit 10 in a TCP mode. A UDP packet analyzing unit 12 extracts received information by analyzing a UDP packet received by the internet communication control unit 10 in a UDP mode.

In a real time transmission procedure, a group 3 protocol information generation unit 13 converts information received from the TCP/IP packet analyzing unit 11 into corresponding group 3 transmission procedure signal information in the TCP mode. In the UDP mode, the group 3 protocol information generation unit 13 converts information received from the UDP packet analyzing unit 12 into corresponding group 3 transmission procedure signal information.

A group 3 protocol information extraction unit 14 extracts group 3 facsimile transmission procedure information to be transmitted in the real time transmission procedure. A TCP/IP packet conversion unit 15 converts the group 3 facsimile transmission procedure information output from the group 3 protocol information extraction unit 14 into TCP/IP packet data in the TCP mode. The output data are supplied to the internet communication control unit 10.

A UDP packet conversion unit 16 converts the group 3 facsimile transmission procedure information output from the group 3 protocol information extraction unit 14 into UDP packet data in the UDP mode. The output data are supplied to the internet communication control unit 10.

An internal bus 17 connects the system control unit 1, the system memory 2, the parameter memory 3, the timer circuit 3, the scanner 5, the plotter 6, the operation display unit 7, the encoding/decoding unit 8, the magnetic disk apparatus 9, the group 3 protocol information generation unit 13 and the group 3 protocol information extraction unit 14. Data exchange among these components is mainly performed via the internal bus 17.

In addition, in this embodiment, in call connection operation, dummy voice capability is reported to the gateway apparatus GW, and a dummy CNG packet (described later) is sent. Therefore, the CNG packet data according to the dummy voice capability is stored in the magnetic disc apparatus 9, for example.

For example, when the dummy voice capability is set such that ITU-T standard G711 capability and ITU-T standard G729 Annex A capability are provided, dummy CNG data #1 and dummy CNG data #2 are formed beforehand and stored in the magnetic disk apparatus 9 (refer to FIG. 3) wherein the dummy CNG data #1 is voice data obtained by voice-encoding a CNG signal that is a predetermined tone signal by the G711 scheme, and the dummy CNG data #2 is voice data obtained by voice-encoding the CNG signal by the G729 Annex A scheme.

Figure 4:
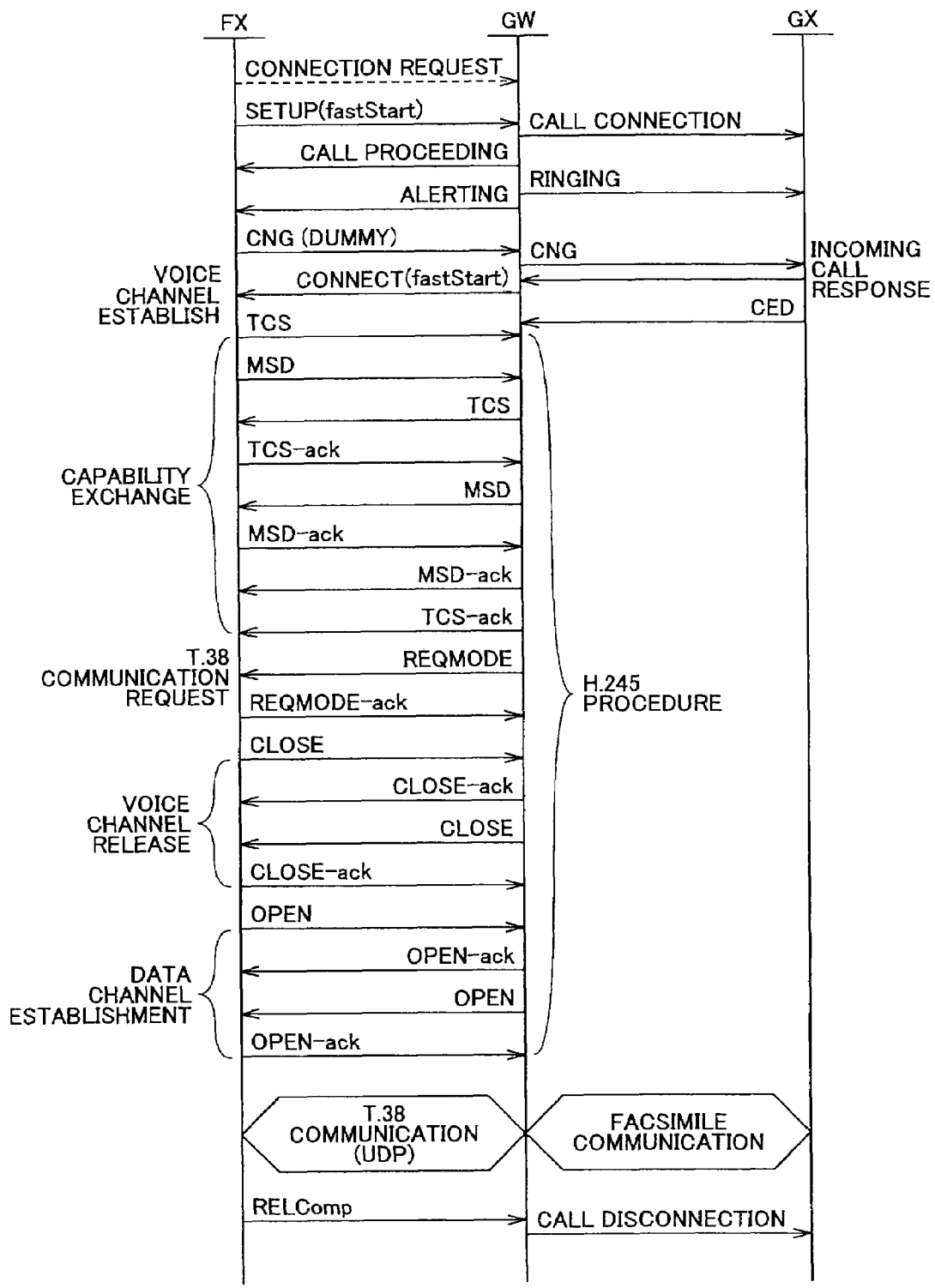
FIG. 4 is a time chart showing an example of a procedure performed when the network communication apparatus FX communicates with the group 3 facsimile apparatus GX via the gateway apparatus GW (ITU-T standard H.323 is applied as the call connection procedure in this case)

FIG. 4 shows an example of a procedure performed when the network communication apparatus FX communicates with the group 3 facsimile apparatus GX via the gateway apparatus GW. In this case, ITU-T standard H.323 is applied as a call connection procedure.

First, the user of the network communication apparatus FX instructs the network communication apparatus FX to start transmission operation in a state in which destination information of the gateway apparatus GW and destination information of the group 3 facsimile apparatus GX that is a final destination are designated.

Then, the network communication apparatus FX sends a call connection request to the gateway apparatus GW to establish a call connection channel between the network communication apparatus FX and the gateway apparatus GW. Then, the network communication apparatus FX sends a message SETUP to the gateway apparatus GW. The message SETUP includes information (fastStart) that declares to use a fast connect procedure, and includes T.38 communication capability and dummy voice capability (G711, and G729 Annex A in this example) as communication functions of the own apparatus, and includes destination information of the final destination (group 3 facsimile apparatus GX, in this example).

Accordingly, the gateway apparatus GW originates a call to the group 3 facsimile apparatus GX that is the designated final destination, and sends messages CALL PROCEEDING, and ALERTING that is for call connection procedure to the network communication apparatus FX via the call connection channel successively according to a predetermined call connection procedure. The gateway apparatus GW sends RINGING (ringing signal) to the group 3 facsimile apparatus GX.

Each of the messages CALL, PROCEEDING, ALERTING and CONNECT (described later) that is sent from the gateway apparatus GW to the network communication apparatus FX includes OLC (OpenLogicalChannel) information.

The OLC information includes logical channel information on which a terminal of call-incoming side actually performs communication, and communication function information to be used. In addition, there is a case where plural pieces of logical channel information are set. By using each of designated logical channels, T.38 communication and voice communication are performed. In this embodiment, transmission of a RTCP packet starts in order to keep connection of the logical channel set for voice communication.

Then, the network communication apparatus FX selects one that is the same as a reported voice capability from the stored dummy CNG packet #1 (G711 voice packet) and dummy CNG packet #2 (G729 Annex A voice packet), and sends the data.

Accordingly, the gateway apparatus GW sends a CNG signal (tone signal) to the group 3 facsimile apparatus GX.

The group 3 facsimile apparatus GX that receives the CNG signal responds to the incoming call, so that the gateway apparatus GW sends the message CONNECT to the network apparatus FX.

Next, the group 3 facsimile apparatus GX sends a signal CED (tone signal) that is a first response signal in the group 3 facsimile transmission procedure according to the ITU-T standard T.30. When the group 3 facsimile apparatus GX is set to automatically switch between a telephone (call) function and a facsimile communication function, the group 3 facsimile apparatus GX automatically switches to the facsimile communication function in response to detecting the tone signal CNG, and the group 3 facsimile apparatus GX sends the signal CED in the same way.

When the group 3 facsimile apparatus GX sends the signal CED in such a way, the gateway apparatus GW detects that the destination side terminal has the group 3 facsimile communication function. Thus, the gateway apparatus GW switches its operation to performing facsimile communication after that.

In addition to that, an ITU-T standard H.245 procedure is performed between the gateway apparatus GW and the network communication apparatus FX. First, a signal TCS is exchanged so that capability is exchanged. Then, the gateway apparatus GW sends T.38 communication request to the network communication apparatus FX using the signal REQMODE.

In response to that, the network communication apparatus FX sends a signal REQMODE-ack in order to receive T.38 gateway communication. Next, the network communication apparatus FX performs a procedure for releaseing unnecessary voice channel between the network communication apparatus TX and the gateway apparatus GW. After that, the network communication apparatus FX establishes data channel necessary for T.38 data communication between the network communication apparatus FX and the gateway apparatus GW.

Accordingly, a logical channel is established between the network communication apparatus FX and the gateway apparatus GW for T.38 data communication. After that, the T.38 data communication is performed between the network communication apparatus FX and the gateway apparatus GW. In addition to that, group 3 facsimile communication operation complying to the T.30 procedure is performed between the gateway apparatus GW and the group 3 facsimile apparatus GX. As a result, image information is sent from the network communication apparatus FX to the group 3 facsimile apparatus GX via the gateway apparatus GW, for example.

Then, when the T.38 communication operation ends, the network communication apparatus FX sends a message RELEASE Comp to the gateway apparatus GW on the call connection channel according to a call release procedure so that the series of the transmission operation ends.

In response to that, the gateway apparatus GW disconnects a call between the gateway apparatus GW and the group 3 facsimile apparatus GX.

Accordingly, in this embodiment, when performing facsimile communication, the network communication apparatus FX sends a message for call connection, to the gateway apparatus GW, that includes not only T.38 communication function (facsimile communication function) but also dummy voice communication function as communication functions to request for communication. Therefore, a communication channel can be properly established between the network apparatus FX and the group 3 facsimile apparatus GX that is a final destination so that transmission operation can be performed properly even though the gateway apparatus is configured to perform T.38 data communication only when the gateway apparatus GW ascertains that the destination side terminal is a facsimile apparatus.

Figure 5:
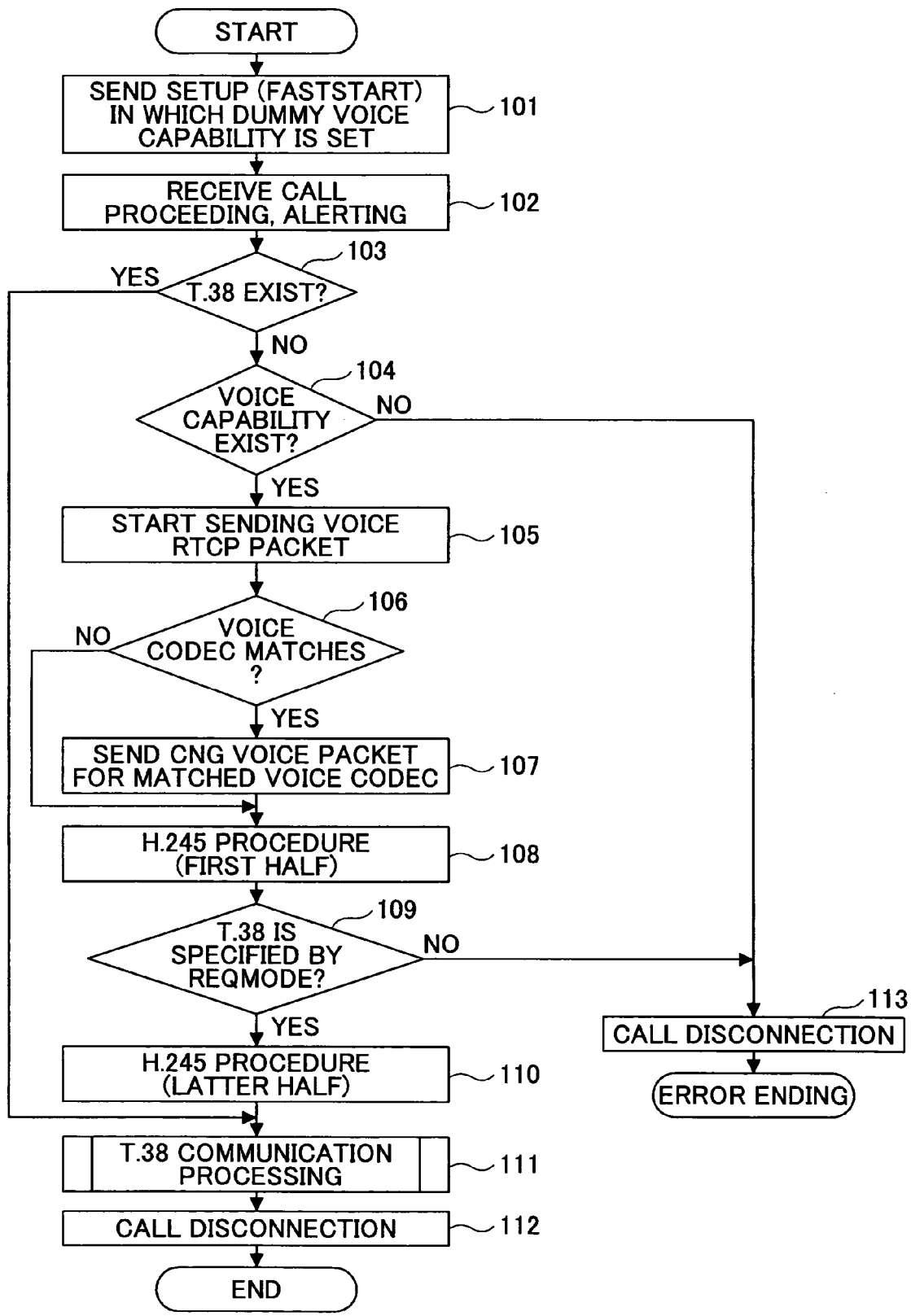
FIG. 5 is a flowchart showing a processing example performed by the network communication apparatus FX at the time of call origination.

FIG. 5 shows a processing example performed by the network communication apparatus FX at the time of call origination.

First, the network communication apparatus FX sends a message SETUP to the gateway apparatus GW wherein the message SETUP includes information (faststart) that declares to use the fast connect procedure, T.38 communication capability, dummy voice capability (G711 and G729 AnnexA in this case), and destination information of the final destination (process 101).

Then, when the network communication apparatus FX receives messages CALL PROCEEDING and ALERTING from the gateway apparatus GW (process 102), the network communication apparatus FX checks OLC information included in the messages to check whether the gateway apparatus GW reports that it includes the T.38 communication function (determination 103).

When the result of the determination 103 is NO, the network communication apparatus FX checks whether the gateway apparatus GW includes voice capability (determination 104). When the result of the determination 104 is YES, the network communication apparatus FX starts to send the voice RTCP packet (process 105).

Next, the network communication apparatus checks whether the voice capability of the gateway apparatus GW is the same as any one of the dummy voice capabilities reported by the network communication apparatus FX (determination 106). When the result of the determination 106 is YES, the network communication apparatus FX sends a dummy CNG packet corresponding to the voice capability that is the same as the voice capability of the gateway apparatus GW (process 107). When the result of the determination 106 is NO, the process 107 is not performed.

Next, the network communication apparatus FX performs first half of the H.245 procedure up to receiving the signal REQMODE with the gateway apparatus GW (process 108). When the network communication apparatus FX receives the signal REQMODE, the network communication apparatus FX checks whether the signal REQMODE includes a request for performing T.38 data communication (determination 109).

When the result of the determination 109 is YES, the network communication apparatus FX performs remaining half of the H.245 procedure so as to establish the logical channel for T.38 data communication (process 110).

Then, the network communication apparatus FX performs the T.38 data communication using the established logical channel (process 111). When the T.38 data communication ends, the network communication apparatus FX performs call disconnection operation (process 112) so as to end the series of the operations for originating a call.

On the other hand, when the T.38 data communication request is not included in the signal REQMODE received from the gateway apparatus GW and the result of the determination 109 is NO, and when the gateway apparatus GW does not include voice capability and the result of the determination 104 is NO, the network communication apparatus performs call disconnection operation (process 113) and ends the call origination operation with an error.

When it is determined that the gateway apparatus GW includes the T.38 communication capability so that the result of the determination 103 is YES, after establishing the logical channel by performing the predetermined fast connection procedure, the process proceeds to the process 111 and the predetermined T.38 communication operation is performed.

Accordingly, in this embodiment, the network communication apparatus performs call connection operation and T.38 communication operation according to the communication capability of the gateway apparatus GW, there is a very high possibility that the network communication apparatus FX can perform communication operation with the destination group 3 facsimile apparatus GX, so that T.38 communication with high availability can be realized.

Figure 6:
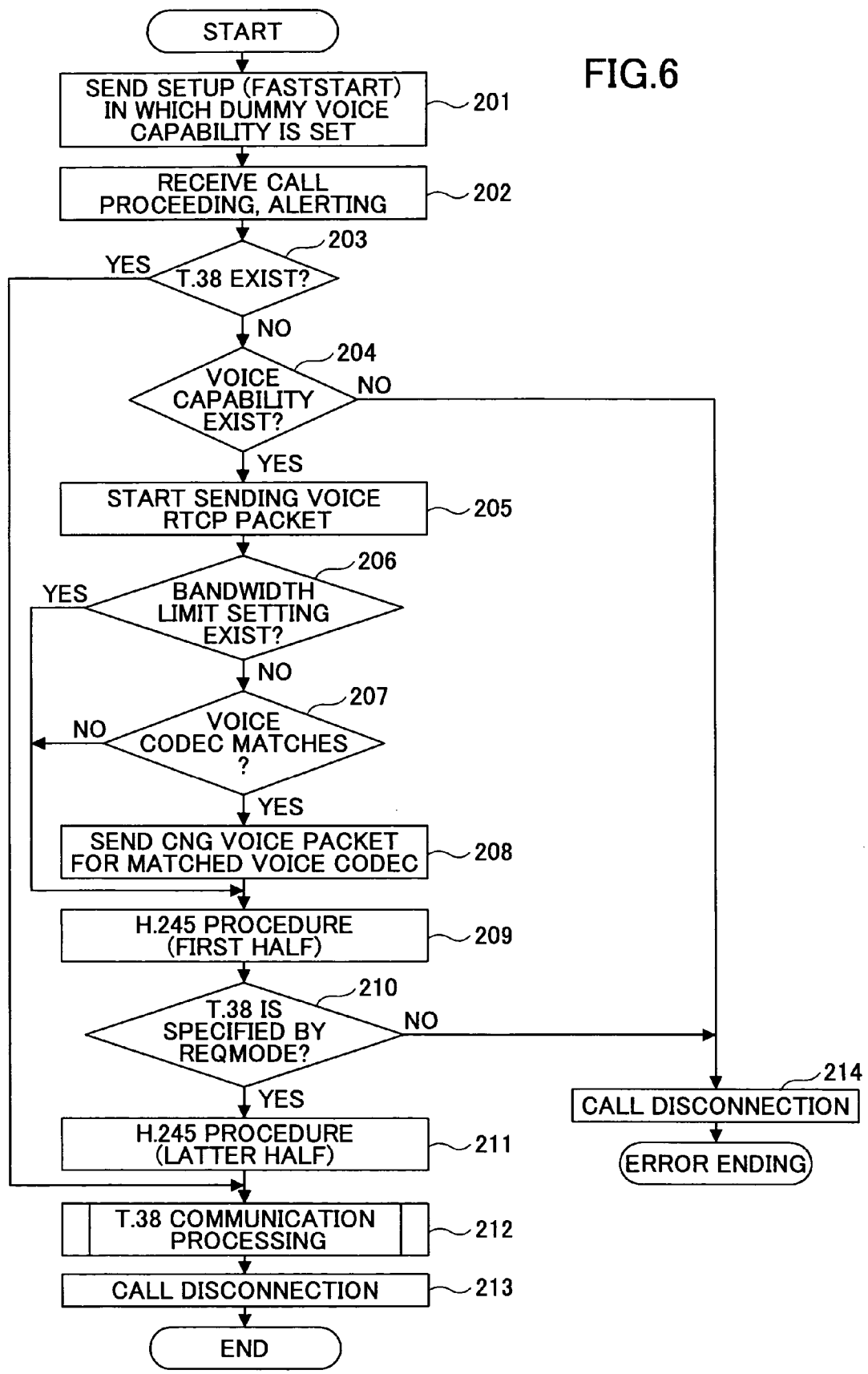
FIG. 6 is a flowchart showing another processing example performed by the network communication apparatus FX at the time of call origination.

FIG. 6 shows another processing example performed by the network communication apparatus FX at the time of call origination.

First, the network communication apparatus FX sends a message SETUP to the gateway apparatus GW wherein the message SETUP includes information (fastStart) that declares to use the fast connect procedure, T.38 communication capability, dummy voice capability (G711 and G729 AnnexA in this case), and destination information of the final destination (process 201).

Then, when the network communication apparatus FX receives messages CALL PROCEEDING and ALERTING from the gateway apparatus GW (process 202), the network communication apparatus FX checks OLC information included in the messages to check whether the gateway apparatus GW reports that it includes the T.38 communication function (determination 203).

When the result of the determination 203 is NO, the network communication apparatus FX checks whether the gateway apparatus GW includes voice capability (determination 204). When the result of the determination 204 is YES, the network communication apparatus FX starts to send the voice RTCP packet (process 205).

Next, the network communication apparatus FX checks whether the network communication apparatus FX includes settings for limiting bandwidth for data communication (determination 206). When the result of the determination 206 is NO, the network communication apparatus checks whether the voice capability of the gateway apparatus GW is the same as any one of the dummy voice capabilities reported by the network communication apparatus FX (determination 207).

When the result of the determination 207 is YES, the network communication apparatus FX sends a dummy CNG packet corresponding to the voice capability that is the same as the voice capability of the gateway apparatus GW (process 208). When the result of the determination 207 is NO or when the result of the determination 206 is NO, the process 208 is not performed, so that the dummy CNG packet is not sent in this case.

Next, the network communication apparatus FX performs first half of the H.245 procedure up to receiving the signal REQMODE between the network communication apparatus FX and the gateway apparatus GW (process 209). When the network communication apparatus FX receives the signal REQMODE, the network communication apparatus FX checks whether the signal REQMODE includes a request for performing T.38 data communication (determination 210).

When the result of the determination 210 is YES, the network communication apparatus FX performs remaining half of the H.245 procedure so as to establish the logical channel for T.38 data communication (process 211).

Then, the network communication apparatus FX performs the T.38 data communication using the established logical channel (process 212). When the T.38 data communication ends, the network communication apparatus FX performs call disconnection operation (process 213) so as to end the series of the operations for originating a call.

On the other hand, when the T.38 data communication request is not included in the signal REQMODE received from the gateway apparatus GW so that the result of the determination 210 is NO, and when the gateway apparatus GW does not include voice capability so that the result of the determination 204 is NO, the network communication apparatus performs call disconnection operation (process 214) and ends the call origination operation with an error.

When it is determined that the gateway apparatus GW includes the T.38 communication capability so that the result of the determination 203 is YES, after establishing the logical channel by performing the predetermined fast connection procedure, the process proceeds to the process 212 and the predetermined T.38 communication operation is performed.

Figure 7:
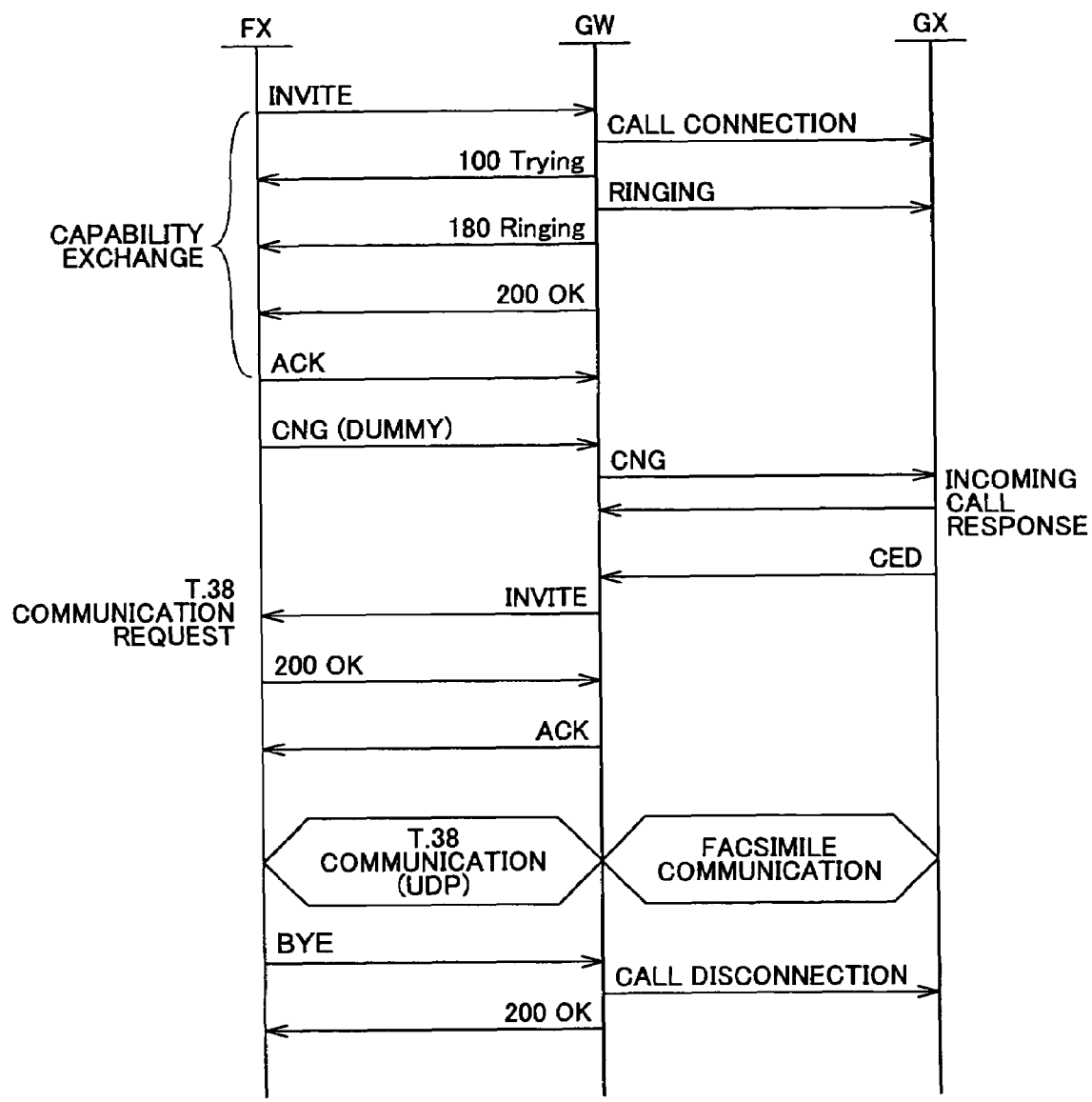
FIG. 7 is a time chart showing another example of a procedure in which the network communication apparatus FX communicates with the group 3 facsimile apparatus GX via the gateway apparatus GW (SIP is used as a call connection protocol)

FIG. 7 shows an example of a procedure in which the network communication apparatus FX communicates with the group 3 facsimile apparatus GX via the gateway apparatus GW using SIP as a call connection protocol.

SIP is defined by a working group in an organization called IETF (Internet Engineering Task Force) investigating technologies on the Internet.

First, the user of the network communication apparatus FX instructs the network communication apparatus FX to start transmission operation in a state in which destination information of the gateway apparatus GW and the destination information of the group 3 facsimile apparatus GX that is a final destination are designated.

Accordingly, the network communication apparatus FX sends a signal INVITE to the gateway apparatus GW. In the processing, the network communication apparatus FX and the gateway apparatus GW exchanges messages INVITE, 100 (Trying), 180 (Ringing), 200 (OK) and ACK to exchange communication capabilities with each other.

When the gateway apparatus GW receives the signal INVITE, the gateway apparatus originates a call to the group 3 facsimile apparatus GX, and sends a signal 100 (Trying) to the network communication apparatus FX. In addition, the gateway apparatus GW sends RINGING (ringing signal) to the group 3 facsimile apparatus GX, and sends a signal 180 (Ringing) to the network communication apparatus FX, and sends 200 (OK) next.

At the time when the network communication apparatus FX receives the signal 200 (OK), the network communication apparatus FX can determine communication capability of the gateway apparatus GW. In addition, the network communication apparatus FX starts to send RTCP packets to keep connection of the voice channel. In addition, the network communication apparatus FX sends a signal ACK to the gateway apparatus GW.

Next, the network communication apparatus FX selects one the same as the reported voice capability from the stored dummy CNG packet #1 (G711 voice packet) and the dummy CNG packet #2 (G729AnnexA voice packet), and sends the data to the gateway apparatus GW.

Accordingly, the gateway apparatus GW sends the CNG signal (tone signal) to the group 3 facsimile apparatus GX.

The group 3 facsimile apparatus that receives the CNG signal responds to the incoming call so that the gateway apparatus GW sends a message CONNECT to the network communication apparatus FX.

Next, the group 3 facsimile apparatus GX sends a signal CED (tone signal) that is a first response signal in the group 3 facsimile transmission procedure according to the ITU-T standard T.30. In addition, in the case when the group 3 facsimile apparatus GX is set such that the group 3 facsimile apparatus GX automatically switches between telephone (telephone call function) and the facsimile communication function, when the group 3 facsimile apparatus GX detects the tone signal CNG, the function is automatically changed to the facsimile communication function, and in the same way, the group 3 facsimile apparatus GX sends the signal CED as a response.

Accordingly, when the group 3 facsimile apparatus GX sends the signal CED, the gateway apparatus GW can ascertain that the destination terminal includes the group 3 facsimile communication apparatus at that time. After that, operations for facsimile communication are performed.

In this case, the gateway apparatus GW sends a signal INVITE(RE-INVITE) to the network communication apparatus FX to request T.38 communication.

In response to that, the network communication apparatus FX sends a signal 200 (OK) in order to receive T.38 gateway communication. In addition, the gateway apparatus GW sends a signal ACK to the network communication apparatus FX.

Accordingly, a logical channel for T.38 data communication is established. After that, T.38 data communication is performed between the network communication apparatus FX and the gateway apparatus GW, and group 3 facsimile communication operation is performed between the gateway apparatus GW and group 3 facsimile apparatus GX according to the T.30 procedure. Thus, image information is transmitted from the network communication apparatus FX to the group 3 facsimile apparatus GX via the gateway apparatus GW, for example.

After the T.38 communication operation ends, the network communication apparatus FX sends a signal BYE to the gateway apparatus GW according to the call release procedure, so that the gateway apparatus GW disconnects the call connection to the group 3 facsimile apparatus GX, and sends the signal 200 (OK) to the network communication apparatus FX.

Accordingly, in this embodiment, the message for call connection sent to the gateway apparatus GW when performing facsimile communication includes, as communication capability to request for communication, not only the T.38 communication function (facsimile communication function) but also dummy voice communication functions. Therefore, the network communication apparatus can properly establish a communication channel to the group 3 facsimile apparatus GX that is the final destination even though the gateway apparatus GW is configured to perform T.38 communication only when it ascertains that the destination terminal is a facsimile apparatus. Thus, sending operation can be properly performed.

Figure 8:
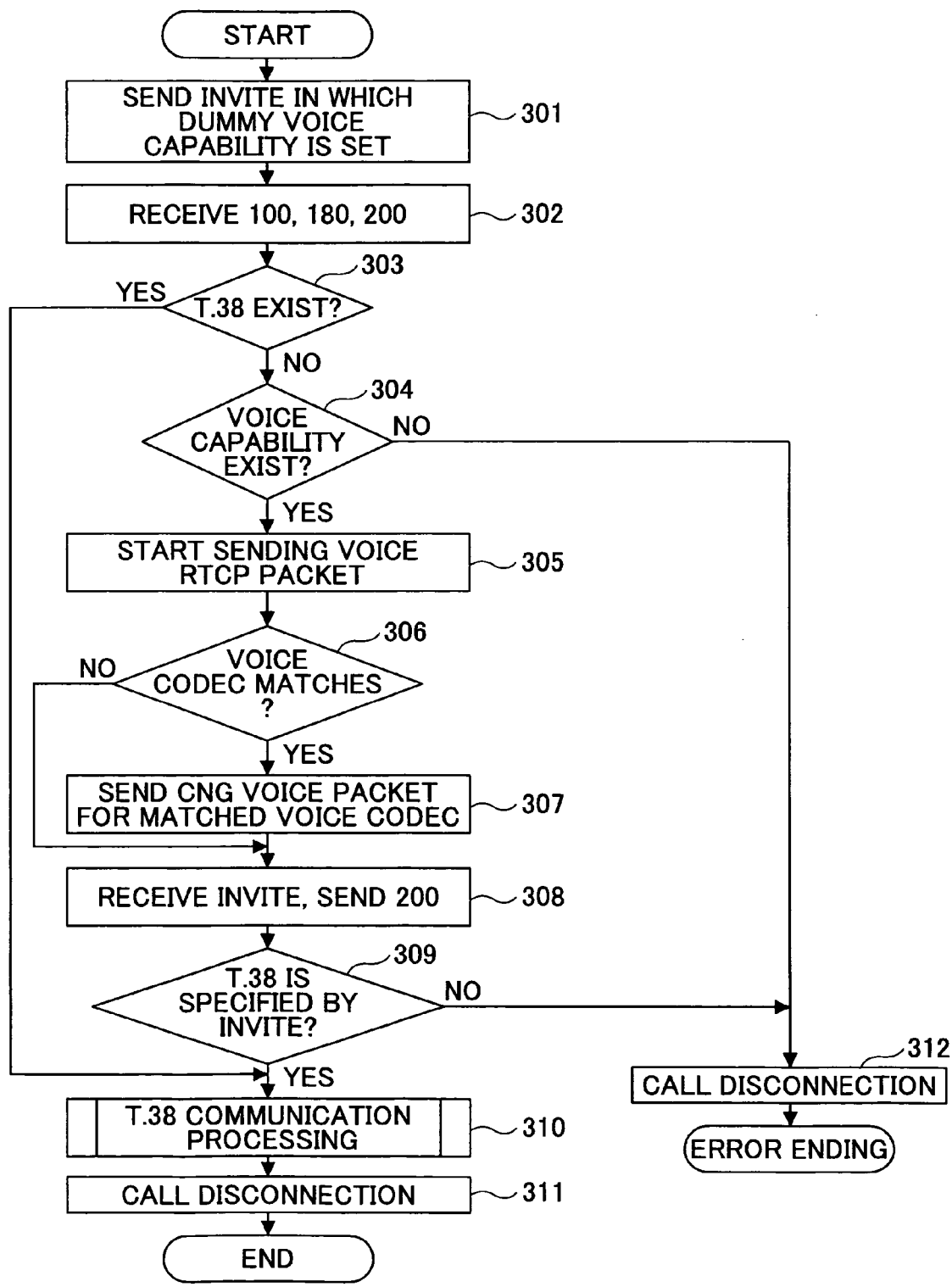
FIG. 8 is a flowchart showing further processing example performed by the network communication apparatus FX at the time of call origination.

FIG. 8 shows a processing example performed by the network communication apparatus FX at the time of call origination.

First, the network communication apparatus FX sends a signal INVITE to the gateway apparatus GW wherein the signal INVITE includes T.38 communication capability, dummy voice capability (G711 and G729AnnexA in this case), and destination information of the final destination (process 301).

Then, when the network communication apparatus FX receives signals 180 (Ringing) and 200 (OK) from the gateway apparatus GW (process 302), the network communication apparatus FX checks communication capability information included in the messages to check whether the gateway apparatus GW reports that it includes the T.38 communication function (determination 303).

When the result of the determination 303 is NO, the network communication apparatus FX checks whether the gateway apparatus GW includes voice capability (determination 304). When the result of the determination 304 is YES, the network communication apparatus FX starts to send the voice RTCP packet (process 305).

Next, the network communication apparatus checks whether the voice capability of the gateway apparatus GW is the same as any one of the dummy voice capabilities reported by the network communication apparatus FX (determination 306). When the result of the determination 306 is YES, the network communication apparatus FX sends a dummy CNG packet corresponding to the voice capability that is the same as the voice capability of the gateway apparatus GW (process 307). When the result of the determination 106 is NO, the process 307 is not performed.

Next, when the network communication apparatus FX receives the signal INVITE(RE-INVITE) from the gateway apparatus GW, the network communication apparatus FX sends the signal 200 (OK) as a response (process 308). Then, the network communication apparatus FX checks whether the received signal INVITE(RE-INVITE) includes a request for performing T.38 data communication (determination 309).

When the result of the determination 309 is YES, the network communication apparatus FX establishes a logical channel for T.38 data communication, and performs T.38 data communication using the established logical channel (process 310). When the T.38 data communication ends, the network communication apparatus FX performs call disconnection operation (process 311) so as to end the series of the operations when originating a call.

On the other hand, when the T.38 data communication request is not included in the signal INVITE(RE-INVITE) received from the gateway apparatus GW so that the result of the determination 309 is NO, and when the gateway apparatus GW does not include voice capability so that the result of the determination 304 is NO, the network communication apparatus performs call disconnection operation (process 312) and ends the call origination operation with an error.

When it is determined that the gateway apparatus GW includes the T.38 communication capability so that the result of the determination 303 is YES, after establishing the logical channel for T.38 data communication, the process proceeds to the process 310 and T.38 communication operation is performed using the established logical channel.

Accordingly, in this embodiment, the network communication apparatus performs call connection operation and T.38 communication operation according to the communication capability of the gateway apparatus GW, there is a very high possibility that the network communication apparatus FX can perform communication operation with the destination group 3 facsimile apparatus GX, so that T.38 communication with high availability can be realized.

FIG. 9 shows another processing example performed by the network communication apparatus FX at the time of call origination.

First, the network communication apparatus FX sends the signal INVITE to the gateway apparatus GW wherein the signal INVITE includes T.38 communication capability, dummy voice capability (G711 and G729AnnexA in this case), and destination information of the final destination (process 401).

Then, when the network communication apparatus FX receives signals 180 (Ringing) and 200 (OK) from the gateway apparatus GW (process 402), the network communication apparatus FX checks communication capability information included in the messages to check whether the gateway apparatus GW reports that it includes the T.38 communication function (determination 403).

When the result of the determination 403 is NO, the network communication apparatus FX checks whether the gateway apparatus GW includes voice capability (determination 404). When the result of the determination 404 is YES, the network communication apparatus FX starts to send the voice RTCP packet (process 405).

Next, the network communication apparatus FX checks whether the network communication apparatus FX includes settings for limiting bandwidth for data communication (determination 406). When the result of the determination 406 is NO, the network communication apparatus checks whether the voice capability of the gateway apparatus GW is the same as any one of the dummy voice capabilities reported by the network communication apparatus FX (determination 407). When the result of the determination 407 is YES, the network communication apparatus FX sends a dummy CNG packet corresponding to the voice capability that is the same as the voice capability of the gateway apparatus GW (process 408).

When the result of the determination 407 is NO or when the result of the determination 406 is NO, the process 408 is not performed, so that the dummy CNG packet is not sent in this case.

Next, when the network communication apparatus FX receives the signal INVITE(RE-INVITE) from the gateway apparatus GW, the network communication apparatus FX sends the signal 200 (OK) as a response (process 409). Then, the network communication apparatus FX checks whether the received signal INVITE(RE-INVITE) includes a request for performing T.38 data communication (determination 410).

When the result of the determination 410 is YES, the network communication apparatus FX establishes the logical channel for T.38 data communication, and performs the T.38 data communication using the established logical channel (process 411). When the T.38 data communication ends, the network communication apparatus FX performs call disconnection operation (process 412) so as to end the series of the operations for originating a call.

On the other hand, when the T.38 data communication request is not included in the signal INVITE(RE-INVITE) received from the gateway apparatus GW so that the result of the determination 410 is NO, and when the gateway apparatus GW does not include voice capability so that the result of the determination 404 is NO, the network communication apparatus performs call disconnection operation (process 413) and ends the call origination operation with an error.

When it is determined that the gateway apparatus GW includes the T.38 communication capability so that the result of the determination 403 is YES, after establishing the logical channel for T.38 data communication, the process proceeds to the process 411 and the predetermined T.38 communication operation is performed using the established logical channel.

The present invention can be applied to any apparatuses having T.38 data communication function even including configurations other than the configuration explained in the embodiments.

The present invention is not limited to the specifically disclosed embodiments, and variations and modifications may be made without departing from the scope of the present invention.

The present application contains subject matter related to Japanese patent application No. 2004-340307, filed in the JPO on Nov. 25, 2004, the entire contents of which are incorporated herein by reference.

What is claimed is:

1. A network communication apparatus that includes a function for performing communications via an IP network and that includes an ITU-T standard T.38 communication function but does not include a voice communication function, the network communication apparatus comprising:
   a unit configured to generate a setup call connection signal including a T.38 communication capability and a dummy voice capability to start a call connection operation;
   a unit configured to send the setup call connection signal to a gateway network communication apparatus located between the network communication apparatus and a destination communication apparatus; and
   a unit configured to receive a call connection signal from the gateway network communication apparatus, to determine whether or not the gateway network communication apparatus includes the T.38 communication function and the dummy voice capability based on the received call connection signal, to send a dummy CNG packet to the gateway network communication apparatus when it is determined that the gateway network communication apparatus has the dummy voice capability but does not have the T.38 communication function, and to perform T.38 communication operation after sending the dummy CNG packet.

2. A network communication apparatus that includes a function for performing communications via an IP network and that includes an ITU-T standard T.38 communication function but does not include a voice communication function, the network communication apparatus comprising:
   a unit configured to generate a setup call connection signal including a T.38 communication capability and a dummy voice capability to start a call connection operation;
   a unit configured to send the setup call connection signal to a gateway network communication apparatus located between the network communication apparatus and a destination communication apparatus;
   a unit configured to receive a call connection signal from the gateway network communication apparatus, to determine whether or not the gateway network communication apparatus includes the dummy voice capability and the T.38 communication function based on the received call connection signal, to send a dummy CNG packet to the gateway network communication apparatus when it is determined that the gateway network communication apparatus has the dummy voice capability but does not have the T.38 communication function, and to perform T.38 communication operation after sending the dummy CNG packet; and
   a unit configured to disconnect the call connection operation without sending the dummy CNG packet when detecting that the gateway network communication apparatus does not include any one of the T.38 communication function and the dummy voice capability based on the received call connection signal.

3. A network communication apparatus that includes a function for performing communications via an IP network and that includes an ITU-T standard T.38 communication function but does not include a voice communication function, the network communication apparatus comprising:
   a unit configured to generate a setup call connection signal including a T.38 communication capability and a dummy voice capability to start a call connection operation and to send the setup call connection signal to a gateway network communication apparatus located between the network communication apparatus and a destination communication apparatus;
   a unit configured to receive a call connection signal from the gateway network communication apparatus, to determine whether or not the gateway network communication apparatus includes the dummy voice capability and the T.38 communication function based on the received call connection signal, to send a dummy CNG packet to the gateway network communication apparatus when it is determined that the gateway network communication apparatus has the dummy voice capability but does not have the T.38 communication function based on the received call connection signal, to perform, when bandwidth limitation is not set in the network communication apparatus, T.38 communication operation after sending the dummy CNG packet, and to disconnect the call connection operation without sending the dummy CNG packet when detecting that the gateway network communication apparatus does not include any one of the T.38 communication function and the dummy voice capability; and
   a unit configured to perform T.38 communication operation without sending the dummy CNG packet when the bandwidth limitation is set.

4. A network communication method performed by a network communication apparatus that includes a function for performing communications via an IP network and that includes an ITU-T standard T.38 communication function but does not include a voice communication function, the network communication method comprising the steps of:
   generating, at the network communication apparatus, a setup call connection signal including a T.38 communication capability and a dummy voice capability to start a call connection operation;
   sending, at the network communication apparatus, the setup call connection signal to a gateway network communication apparatus located between the network communication apparatus and a destination communication apparatus;
   receiving, at the network communication apparatus, a call connection signal from the gateway network communication apparatus,
   determining, at the network communication apparatus, whether or not the gateway network communication apparatus includes the dummy voice capability and the T.38 communication function based on the received call connection signal;
   sending, at the network communication apparatus, a dummy CNG packet to the gateway network communication apparatus when it is determined that the gateway network communication apparatus has the dummy voice capability but does not have the T.38 communication function based on the received call connection signal;

performing, at the network communication apparatus, T.38 communication operation after sending the dummy CNG packet.

5. A network communication method performed by a network communication apparatus that includes a function for performing communications via an IP network and that includes an ITU-T standard T.38 communication function but does not include a voice communication function, the network communication method comprising the steps of:

generating, at the network communication apparatus, a setup call connection signal including a T.38 communication capability and a dummy voice capability to start a call connection operation;

sending, at the network communication apparatus, the setup call connection signal to a gateway network communication apparatus located between the network communication apparatus and a destination communication apparatus;

receiving, at the network communication apparatus, a call connection signal from the gateway network communication apparatus, determining, at the network communication apparatus, whether or not the gateway network communication apparatus includes the dummy voice capability and the T.38 communication function based on the received call connection signal;

sending, at the network communication apparatus, a dummy CNG packet to the gateway network communication apparatus when it is determined that the gateway network communication apparatus has the dummy voice capability but does not have the T.38 communication function based on the received call connection signal;

performing, at the network communication apparatus, T.38 communication operation after sending the dummy CNG packet; and disconnecting, at the network communication apparatus, the call connection operation without sending the dummy CNG packet when detecting that the gateway network communication apparatus does not include any one of the T.38 communication function and the dummy voice capability based on the received call connection signal.

6. A network communication method performed by a network communication apparatus that includes a function for performing communications via an IP network and that includes an ITU-T standard T.38 communication function but does not include a voice communication function, the network communication method comprising the steps of:

generating, at the network communication apparatus, a setup call connection signal including a T.38 communication capability and a dummy voice capability to start call connection operation;

sending, at the network communication apparatus, the setup call connection signal to a gateway network communication apparatus located between the network communication apparatus and a destination communication apparatus;

receiving, at the network communication apparatus, a call connection signal from the gateway network communication apparatus, determining, at the network communication apparatus, whether or not the gateway network communication apparatus includes the dummy voice capability and the T.38 communication function based on the received call connection signal;

sending, at the network communication apparatus, a dummy CNG packet to the gateway network communication apparatus when it is determined that the gateway network communication apparatus has the dummy voice capability but does not have the T.38 communication function based on the received call connection signal;

performing, at the network communication apparatus, when bandwidth limitation is not set in the network communication apparatus, T.38 communication operation after sending the dummy CNG packet, and disconnecting the call connection operation without sending the dummy CNG packet when detecting that the gateway network communication apparatus does not include any one of the T.38 communication function and the dummy voice capability; and performing, at the network communication apparatus, T.38 communication operation without sending the dummy CNG packet when the bandwidth limitation is set.

7. A gateway apparatus which relays communications between an IP network and a switched telephone network, the gateway apparatus comprising:

a unit configured to receive a call connection request from a first communication apparatus connected to the IP network which indicates a T.38 communication capability and a dummy voice capability to start call connection operation, and to transmit the call connection request to a second communication apparatus connected to the switched telephone network;

a unit configured to transmit information indicating whether the gateway apparatus has a the dummy voice capability and the T.38 communication function to the first communication apparatus;

a unit configured to receive a dummy CNG packet corresponding to a voice capability of the gateway apparatus from the first communication apparatus when the gateway apparatus indicates to the first communication apparatus that the gateway apparatus includes the dummy voice capability but not the T.38 communication function, and to transmit a CNG signal to the second communication apparatus based on the dummy CNG packet; and a unit configured to perform facsimile communications with the second communication apparatus based on a T.38 communication request from the first communication apparatus.

8. A method implemented on a gateway apparatus which relays communications between an IP network and a switched telephone network, comprising:

receiving, at the gateway apparatus, a call connection request from a first communication apparatus connected to the IP network which indicates a T.38 communication capability and a dummy voice capability to start call connection operation, and transmitting the call connection request to a second communication apparatus connected to the switched telephone network;

transmitting, a the gateway apparatus, information indicating whether the gateway apparatus has a the dummy voice capability and the T.38 communication function to the first communication apparatus;

receiving, at the gateway apparatus, a dummy CNG packet corresponding to a voice capability of the gateway apparatus from the first communication apparatus when the gateway apparatus indicates to the first communication apparatus that the gateway apparatus includes the dummy voice capability but not the T.38 communication function, and transmitting a CNG signal to the second communication apparatus based on the dummy CNG packet; and performing, at the gateway apparatus, facsimile communications with the second communication apparatus based on a T.38 communication request from the first communication apparatus.

* * * * *